United States Patent [19]
Xu

[11] Patent Number: 5,519,196
[45] Date of Patent: May 21, 1996

[54] MATERIAL FOR CONVERTING MICROWAVE ENERGY INTO THERMAL ENERGY, AND A COOKING RECEPTACLE FABRICATED FROM THAT MATERIAL

[76] Inventor: Liming Xu, 9107 Autoville Dr., College Park, Md. 20740

[21] Appl. No.: 456,795

[22] Filed: Jun. 1, 1995

[51] Int. Cl.$^6$ .................................................. H05B 6/80
[52] U.S. Cl. ................ 219/730; 219/759; 99/DIG. 14; 426/243; 426/234
[58] Field of Search .................. 219/730, 759; 99/DIG. 14; 426/107, 109, 234, 241, 243

[56] References Cited

U.S. PATENT DOCUMENTS

| | | | |
|---|---|---|---|
| 3,701,872 | 10/1972 | Levinson | 219/10.55 |
| 3,731,037 | 5/1973 | Levinson | 219/10.55 |
| 3,777,099 | 12/1973 | Levinson | 219/10.55 |
| 3,853,612 | 12/1974 | Spanoudis | 117/212 |
| 3,881,027 | 4/1975 | Levinson | 426/234 |
| 3,922,452 | 11/1975 | Forker, Jr. et al. | 428/35 |
| 4,143,647 | 3/1979 | Husslein et al. | 126/390 |
| 4,155,788 | 5/1979 | Crandall et al. | 156/89 |
| 4,496,815 | 1/1985 | Jorgensen | 219/10.55 |
| 4,641,005 | 2/1987 | Seiferth | 219/10 |
| 4,866,235 | 9/1989 | Griffin et al. | 219/10.55 |
| 4,943,439 | 7/1990 | Andreas et al. | 426/107 |
| 4,948,932 | 8/1990 | Clough | 219/10.55 |
| 4,970,358 | 11/1990 | Brandberg et al. | 219/10.55 |
| 4,970,360 | 11/1990 | Pesheck et al. | 219/10.55 |
| 4,977,302 | 12/1990 | Merigaud et al. | 219/10.55 |
| 4,982,064 | 1/1991 | Hartman et al. | 219/10.55 |
| 5,002,826 | 3/1991 | Pollart et al. | 219/730 |
| 5,003,142 | 3/1991 | Fuller | 219/10.55 |
| 5,107,087 | 4/1992 | Yamada et al. | 219/10.55 |
| 5,155,319 | 10/1992 | Chiu | 219/10.491 |
| 5,177,332 | 1/1993 | Fong | 219/10.55 |
| 5,183,787 | 2/1993 | Seaborne | 501/143 |
| 5,189,273 | 2/1993 | Inukai et al. | 219/10.55 |
| 5,217,765 | 6/1993 | Parks | 428/34.2 |
| 5,220,140 | 6/1993 | Ball et al. | 219/10.55 |
| 5,231,268 | 7/1993 | Hall et al. | 219/10.55 |
| 5,239,153 | 8/1993 | Beckett | 219/10.55 |
| 5,310,584 | 5/1994 | Jacoby et al. | 426/127 |

*Primary Examiner*—Philip H. Leung
*Attorney, Agent, or Firm*—Bacon & Thomas

[57] ABSTRACT

A material for converting microwave energy into thermal energy is made of a composition which includes a combination of iron oxide, a polymer coating, and at least the following compounds: calcium carbonate, water, aluminum silicate, ethylene glycol, and mineral spirits. The material performs the microwave to thermal conversion according to the principle of induction heating. A microwave cooking receptacle incorporates the converting material into its cooking surface for browning and searing food.

10 Claims, 1 Drawing Sheet

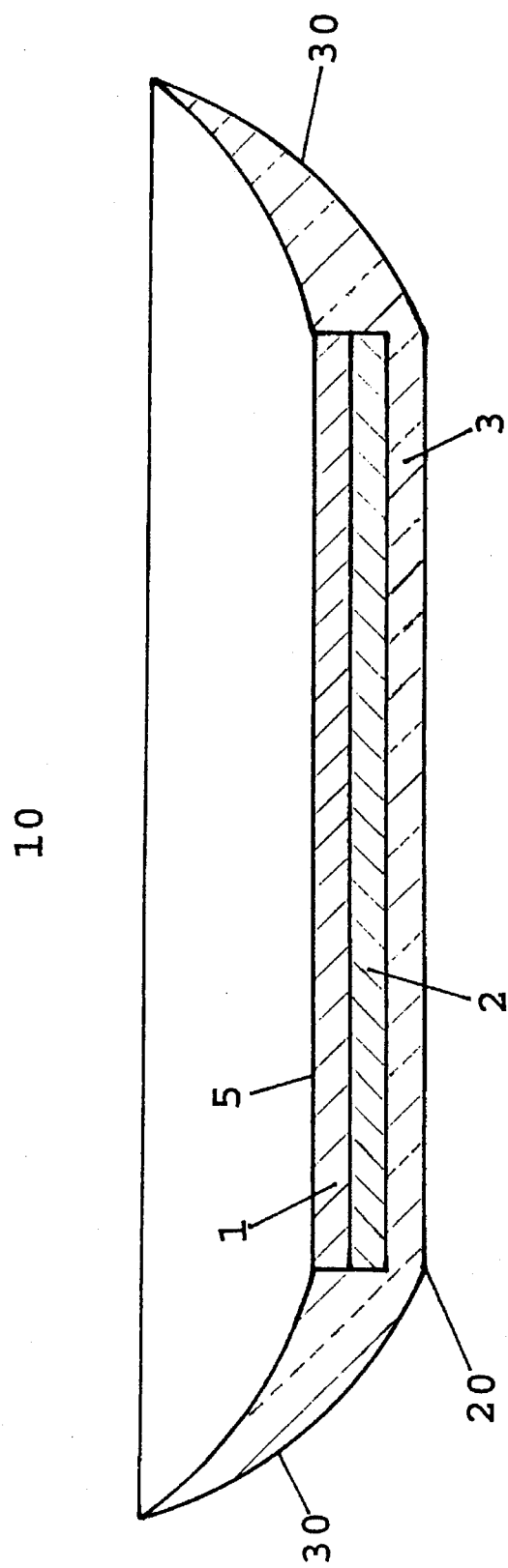

MATERIAL FOR CONVERTING MICROWAVE ENERGY INTO THERMAL ENERGY, AND A COOKING RECEPTACLE FABRICATED FROM THAT MATERIAL

BACKGROUND OF THE INVENTION

1. Field of the Invention

This invention generally relates to materials for converting microwave energy into thermal energy, and further to microwave cooking receptacles which brown and sear food by using materials of this type. In particular, this invention relates to a compound made up of a high impedance soft magnetic material and other materials, and which has improved microwave conversion properties and lower cost, and to cookware made from the compound. Examples of suitable high impedance soft magnetic materials include ferrites and soft magnetic iron powder. Although the specific example given below uses iron oxide, those skilled in the art will appreciate that iron powder could be substituted for the purpose of even further lowering the cost of the material.

2. Description of the Related Art

Compounds of iron or iron oxide have been known since the beginning of the "iron age." More recently, it has been proposed to use a ferrite coating on a disposable container to convert microwave energy to heat in order to improve the browning, crisping, or searing properties of the container. Such a coating is described, for example, in U.S. Pat. No. 5,079,398. While a heating effect is said to be achieved (370°–400° F. in less than about 5 minutes or 120°–140° F. within about three minutes), however, the time it takes to reach an adequate temperature is unacceptably slow and the coatings described therein are costly and difficult to manufacture and also relatively costly in comparison with the material and cookware structure of the present invention.

Both the present invention and the material described in U.S. Pat. No. 5,079,398 are directed to the same problem, namely that certain foods cooked in a microwave oven are, by their appearance, displeasing because the microwave cooking process does not produce a color and texture in the food similar to that produced by conventional cooking methods, i.e., microwave-cooked food often is not seared, browned, and crisp, and in addition the compound of the present invention can use ferrite as one of the elements of the compound, the similarities essentially end there. The present invention provides a much more practical solution to the problem than did prior approaches, with better results such as improved durability and a lower heating time.

Although the present invention involves material which directly converts microwaves to thermal energy, those skilled in the art will appreciate by way of background that an alternative type of non-iron oxide based converting material can be fabricated from a plurality of resistive particles, each of which functions as an independent electrode so that adjacent pairs of particles form spark gaps. This alternative type of material is less relevant to the present invention than the direct conversion materials, and has the separate disadvantage that, when the resistive particles are irradiated with microwave energy, electric arcs form across the spark gaps, thereby producing an amount of thermal energy sufficient to sear and brown food. Converting materials of this type are disclosed, for example, in U.S. Pat. Nos. 4,496,815, 3,777,099, 3,731,037, and 3,701,872. In use, this type of converting material has at least the drawback that, in order for it to reach a temperature high enough for cooking, it has to be preheated in a microwave oven. This preheating step adds to the overall cooking time of the food, and thus undercuts what is generally accepted to be the primary advantage of microwave cooking—rapid food preparation.

Other types of converting materials such as semiconductor films do not require preheating (see, for example, U.S. Pat. Nos. 5,239,153, 4,970,360, 4,948,932, and 4,641,005), but such materials are in general primarily used in disposable cooking containers, and are not well suited for use in permanent cookware which requires washing and re-use on a daily basis.

It is clear from the foregoing discussion that converting materials presently in use in microwave cookware have drawbacks which limit, either in terms of convenience or economics, the everyday life of the consumer. A need therefore exists for an improved converting material which, when incorporated into the cooking surface of a microwave oven receptacle, will brown and sear food without realizing any of the disadvantages of existing microwave cookware.

SUMMARY OF THE INVENTION

It is a principal objective of the present invention to provide an improved material for converting microwave energy into thermal energy that is more economical to manufacture than known converting materials, including prior materials based on a composition of iron oxide.

It a second objective of the present invention to provide an improved material that is not only economical to manufacture but which has a composition that can be altered to achieve a desired temperature.

It is a third objective of the present invention to provide an improved material having the aforementioned properties which is encapsulated in a protective polymer coating for making the material impervious to moisture, and yet which is flexible and thus resistant to cracking, washable and reusable.

It is a fourth objective of the present invention to provide an improved microwave cooking receptacle, intended for permanent everyday use, which incorporates into its cooking surface a converting material having all of the aforementioned properties.

It is a fifth objective of the present invention to provide an improved microwave cooking receptacle which, when irradiated with microwave energy, can cook food without having to be preheated.

The foregoing and other objectives of the invention are achieved by providing a converting material which is made of a composition which includes a predetermined percentage of iron oxide, and which enables the converting material to be more economically manufactured as compared with known converting materials. In particular, the present invention provides a material for converting microwave energy to thermal energy which is made up of 50–70% iron oxide and a combination of two or more additives, and further mixed with water, calcium carbonate, aluminum silicate, a resin polymer, a rubber polymer, ethylene glycol, and mineral spirits.

In practice, the converting material converts microwave energy into thermal energy according to the principle of induction heating: Microwave energy impinging on the converting material creates eddy currents which generate an amount of thermal energy which depends in part on the percentage of iron oxide in the converting material.

The microwave cooking receptacle of the present invention includes a layer containing the converting material of the present invention interposed between a heat-absorbing layer and a heat-insulating layer. When irradiated with microwave energy, the converting layer generates heat which migrates to an upper surface of the heat-absorbing layer to raise the temperature of that upper surface to a level sufficient to brown and sear food thereon. Because the amount of thermal energy generated by the converting layer is proportional to the percentage of iron oxide contained in the composition, the maximum temperature of the cooking surface may be adjusted by adjusting the percentage of iron oxide in the converting layer.

Because the converting layer is enshrouded in a protective polymer coating, the cooking receptacle of the present invention is well suited for washing, which makes it ideal for everyday use. Moreover, the use of the above-described combination of materials in its converting layer, as opposed to other converting materials known in the prior art, enables the cooking receptacle of the present invention to cook food without having to be preheated.

BRIEF DESCRIPTION OF THE DRAWINGS

The sole FIGURE is a cross-sectional view of a microwave cooking receptacle made from the converting material of the present invention.

DETAILED DESCRIPTION OF THE PREFERRED EMBODIMENTS

The present invention is, in one respect, a material for converting microwave energy into thermal energy and, in another respect, a microwave cooking receptacle fabricated from this converting material.

The converting material of the present invention is made of a composition which includes a predetermined percentage of iron oxide coupled with at least two additives. Applicant has found that an iron oxide composition of between 50% and 70% provides the best performance.

The iron oxide in the composition is combined with other components including water, calcium carbonate, aluminum silicate ethylene glycol, and mineral spirits. The total mixture is then encapsulated in a resin polymer coating and a rubber polymer coating, both of which function to protect the converting material against moisture in order to provide an improved material which converts microwave energy into thermal energy according to the principle of induction heating: Microwave energy impinging on the converting material induces eddy currents in the material. The aggregate effect of these eddy currents is to produce an amount of thermal energy, and thus a converting material temperature, which is proportional to the percentage of iron oxide contained in the material.

The microwave cooking receptacle of the present invention may assume any size or shape desired. For example, the cooking receptacle may have the size and shape of a casserole dish, a sauce pan, a baking dish, or any number of cooking containers.

The sole FIGURE shows a cross-sectional view of the cooking receptacle 10 of the present invention in the shape of a baking dish. The receptacle includes a base 20 and a curved retaining wall 30 circumscribing the base. The base is fabricated from at least three layers. The first layer 1 functions as a heat-absorbing layer. It is preferably made of aluminum, iron, or an alloy of aluminum or iron. Layer 1 contains an upper surface 5 for supporting food to be cooked. To improve the appearance and texture of the food cooked in the receptacle, surface 5 may be treated with a non-stick coating such as Teflon™.

The second layer 2 functions as a converting layer. It is made of a composition that includes the converting material of the present invention, as previously described. Converting layer 2 preferably has a surface area which is substantially equal to the surface area of heat-absorbing layer 1, so as to ensure that food resting on surface 5 is uniformly and thoroughly heated by the thermal energy generated by the converting material. Other arrangements of the converting layer, however, are possible. For example, the converting material may be arranged in a pattern of strips underneath metal layer 1.

The third layer 3, which may be made of the same material and be physically continuous with layer 30, functions as an RF and heat insulation layer. Layer 3 preferably is made of a high temperature resist material such as glass, ceramic, and plastic. A commercial material known as Bakelite™ may also be used.

In practice, food to be cooked is placed onto the upper layer of metal layer 1. The receptacle is then placed into an oven and irradiated with microwave energy. The converting layer in the receptacle converts this microwave energy into an amount of thermal energy proportional to the percentage of iron oxide contained in the converting layer. The thermal energy migrates through the heat-absorbing layer to heat the upper surface to a temperature sufficient to sear and brown the food. Because the amount of thermal energy produced by the converting layer depends on the percentage of iron oxide that it contains, the maximum cooking temperature of the cooking receptacle can be adjusted by adjusting the percentage of iron oxide in the converting layer.

In one example of the present invention, a cooking receptacle having a converting layer containing between 50% and 70% iron oxide was irradiated in a 600 W microwave oven. After 3 minutes exposure, the upper surface of the receptacle reached a temperature of 300° F. The converting material remained at this temperature for as long as the microwave energy continued to irradiate the material. This ability to remain at a maximum temperature regardless of how long it is exposed to microwave energy advantageously allows the cooking receptacle of the present invention to cook food without burning it.

The microwave cooking receptacle of the present invention in many ways outperforms cookware made from converting materials known in the prior art.

First, because it requires less iron oxide, the cooking receptacle of the present invention is more economical to manufacture than known cooking receptacles, which use ferrite-based or resistive particle-type converting materials that require special preparation prior to their incorporation.

Second, the cooking receptacle of the present invention can rapidly generate an amount of heat sufficient for cooking food without requiring preheating. The same cannot be said for many types of cooking receptacles known in the prior art.

Third, because its converting material is encapsulated in a protective polymer coating to form a single layer having a thickness of 1–3 mm, the cooking receptacle of the present invention eliminates the need for multiple coating steps during manufacture and yet is more durable than conventional materials, and thus can for example be subjected to repeated cleaning in a dishwasher, making it is well suited for everyday use. In contrast, many converting materials known in the prior art are not treated with a protective coating. As a result, cookware fabricated from prior art converting materials are susceptible to damage and deterioration from moisture, and thus are not well suited for everyday use.

Other modifications and variations to the invention will be apparent to those skilled in the art from the foregoing disclosure. Thus, while only certain embodiments of the invention have been specifically described herein, it will be apparent that numerous modifications may be made thereto without departing from the spirit and scope of the invention.

What is claimed is:

1. In a material for converting microwave energy into thermal energy, said material comprising:

a composition including a predetermined percentage of a soft magnetic material which, when irradiated with microwave energy, generates eddy currents, said eddy currents producing thermal energy in an amount sufficient to cause said material to reach a maximum desired temperature, said temperature being proportional to the percentage of iron oxide in said composition, the improvement wherein the composition further includes a polymer coating and at least the following compounds: calcium carbonate, water, aluminum silicate, ethylene glycol, and mineral spirits.

2. A material as recited in claim 1, wherein said soft magnetic material is iron oxide and said predetermined percentage lies in a range between 50% and 70%.

3. A material as recited in claim 1, wherein said polymer coating includes a resin polymer and a rubber polymer.

4. A receptacle for holding food to be cooked in a microwave oven, said receptacle comprising:

a first layer containing a heat-absorbing material and having an upper surface upon which food is placed;

a second layer containing a heat-insulating material; and a third layer, interposed between said first and second layers, containing:

a composition which includes a predetermined percentage of a soft magnetic material that, when irradiated with microwave energy, generates eddy currents, said eddy currents producing thermal energy which migrates through said first layer to heat the upper surface of said first layer to a desired maximum temperature, said temperature being proportional to the percentage of iron oxide in said composition; and said composition further including a polymer coating and at least the following compounds: calcium carbonate, water, aluminum silicate, ethylene glycol, and mineral spirits.

5. A receptacle as defined in claim 4, wherein said heat absorbing material is selected from a group consisting of iron, aluminum, and alloys of iron and aluminum.

6. A receptacle as defined in claim 4, wherein said heat insulating material is selected from a group consisting of glass, ceramic, and plastic.

7. A receptacle as defined in claim 4, wherein said soft magnetic material is iron oxide and said predetermined percentage of soft magnetic material lies in a range between 50% and 70%.

8. A receptacle as recited in claim 4, wherein said polymer coating includes a resin polymer and a rubber polymer.

9. A receptacle as recited in claim 4, wherein said composition further comprises an additive.

10. A receptacle as recited in claim 4, further comprising a non-stick coating on the upper surface of said first layer.

* * * * *